United States Patent
Von Basse et al.

(10) Patent No.: US 6,365,888 B2
(45) Date of Patent: Apr. 2, 2002

(54) METHOD FOR CAPACITIVE IMAGE ACQUISITION

(75) Inventors: Paul-Werner Von Basse, Wolfratshausen; Josef Willer, Riemerling; Thomas Scheiter, Oberhaching; Stephan Marksteiner, Neubiberg, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/782,733

(22) Filed: Feb. 13, 2001

Related U.S. Application Data

(63) Continuation of application No. PCT/DE99/02523, filed on Aug. 12, 1999.

(30) Foreign Application Priority Data

Aug. 13, 1998 (DE) ......................... 198 36 770

(51) Int. Cl.[7] .............................................. H01L 27/00
(52) U.S. Cl. ................................... 250/208.1; 250/556
(58) Field of Search ............................ 250/208.1, 556, 250/566, 214 R, 559.22, 559.44; 356/71; 382/305, 306, 312

(56) References Cited

U.S. PATENT DOCUMENTS 4,290,052 A 9/1981 Eichelberger et al.
5,489,888 A * 2/1996 Jagiella et al. .............. 340/537

FOREIGN PATENT DOCUMENTS

| DE | 197 56 560 A1 | 7/1999 |
| EP | 0 791 899 A2 | 8/1997 |
| GB | 2 244 164 A | 11/1991 |

OTHER PUBLICATIONS

Marco Tartagni et al.: "A 390 dpi Live Fingerprint Imager Based on Feedback Capacitive Sensing Scheme", 1997 IEEE International Solid–State Circuits Conference, pp. 200–201; (Month unknown).

N.D. Young et al.: "Novel Fingerprint Scanning Arrays Using Polysilicon TFT's on Glass and Polymer Substrates", IEEE Electron Device Letters, vol. 18, No. 1, Jan. 1997, pp. 19–20.

* cited by examiner

Primary Examiner—Que T. Le
(74) Attorney, Agent, or Firm—Herbert L. Lerner; Laurence A. Greenberg; Werner H. Stemer

(57) ABSTRACT

A grid-shaped array of conductor areas is used for capacitive image acquisition. Shielding conductors are disposed in each case between the conductors that are provided for measurement. During a plurality of charging and discharging cycles, the potential is always carried along on the conductors belonging to a respective pixel in order to prevent displacement currents between the shielding capacitors. By way of example, a compensation line with a feedback operational amplifier can be used for identically altering the electrical potentials on the conductors.

3 Claims, 3 Drawing Sheets

METHOD FOR CAPACITIVE IMAGE ACQUISITION

CROSS-REFERENCE TO RELATED APPLICATION

This application is a continuation of copending International Application PCT/DE99/02523, filed Aug. 12, 1999, which designated the United States.

BACKGROUND OF THE INVENTION

Field of the Invention

The present invention relates to a method for capacitive image acquisition which is suitable, in particular, for acquiring fingerprint images by means of sensors effecting capacitive measurement.

In the case of capacitive surface sensors, e.g. in the case of fingerprint sensors, the distance between the object to be measured (e.g. the surface of the finger) and the sensor is measured by a grid-shaped array of small conductor areas (pads). In the case of a fingerprint sensor, these conductor areas are very small and have a dimension of approximately 50 μm to 100 μm. Such fingerprint sensors effecting capacitive measurement are specified, for instance, in the overview article by Tartagni and Guerrieri: "A 390 dpi Live Fingerprint Imager Based on Feedback Capacitive Sensing Scheme" in ISSCC97, pages 154, 155 and 402. The capacitances with respect to the measurement object are very small, so that parasitic capacitances e.g. with respect to the adjacent conductor or with respect to the support of the relevant sensor have an interfering effect on the measurement results. Sensitive amplifiers are necessary in order to be able to isolate the small measurement signals from the relatively large interference signals. The interference signals contained in the amplified signals can be suppressed either directly by measurement technology or after AD conversion by digital processing of the signal obtained. These measures are complicated and require a high degree of accuracy.

SUMMARY OF THE INVENTION

The object of the present invention is to provide a capacitive image acquisition method which overcomes the above-noted deficiencies and disadvantages of the prior art devices and methods of this general kind, and which is suitable, in particular, for acquiring fingerprints and can be implemented with little technical complexity.

With the above and other objects in view there is provided, in accordance with the invention, a method for capacitive image acquisition, which comprises:

a) dividing an area to be acquired as an image in a grid-shaped array into pixels assigned an assembly of electrical conductors comprising, for each pixel, a measuring conductor and a shielding conductor;

b) placing the area to be acquired as an image opposite the measuring conductors, so that a capacitance is present between the pixels and the measuring conductors in each case dependent on the relevant pixel;

c) at each pixel, connecting the measuring conductor and the shielding conductor to the same electrical potential and disconnecting from the potential;

d) at each pixel, discharging a charge present on one of the measuring conductor and the shielding conductor onto a respective collecting capacitor, and simultaneously compensating a potential difference between the measuring conductor and the shielding conductor; and e) repeating steps c and d until the charges collected on the collecting capacitors have at least a value predetermined to be sufficient for a separate measurement of each collecting capacitor.

In accordance with an added feature of the invention, the potential difference between the respective measuring conductor and the respective shielding conductor is compensated identically for all pixels by placing the shielding conductors on the same predetermined potential.

In accordance with a concomitant feature of the invention, the potential difference between the respective measuring conductor and the respective shielding conductor is compensated separately for all the pixels, by always applying a same potential that is currently present on the measuring conductor to the respective shielding conductor.

The invention uses an arrangement of individual sensors effecting capacitive measurement which each comprise conductor areas, some of which are provided as measuring conductors and some are used as shielding conductors in order to shield the capacitances of the individual sensors from adjacent sensors. By means of transistors used as switches, a predetermined electrical potential is cyclically applied to all the conductors and the charge which accumulates thereon on account of the various capacitances—caused by the image—with respect to the measuring conductors is dissipated onto a collecting capacitor. During this operation, a connected compensation line, which has a feedback comparator in the preferred embodiment, ensures that the potential on the conductors remains at least approximately compensated, so that there is no electrical voltage across the capacitors and charging that is present can have arisen only through a further external capacitance, but not through undesirable displacement currents between the conductors.

A surface of an image which is to be acquired and engenders a locally variable capacitance relative to the conductors arranged in the grid, as is the case with the skin surface of a fingerprint, is arranged parallel to the area of the conductors during the measurement operation. Thus, the result is different charging of the individual measuring areas in accordance with the capacitance of the image present. By means of repeated charging and discharging of the capacitors of the individual sensors, the charge respectively accumulating thereon can be added on a further capacitor to the extent that these charges can be measured with little technical complexity. In a manner governed by the circuit used, the conductors, including the conductors provided as guard ring, are always at the same potential, so that no displacement currents occur between all the conductor areas present. The effect achieved in this way is that using a fundamentally known sensor arrangement for image acquisition, it is also possible to acquire images such as e.g. fingerprints which engender only very small capacitive differences.

Other features which are considered as characteristic for the invention are set forth in the appended claims.

Although the invention is illustrated and described herein as embodied in a method for capacitive image acquisition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
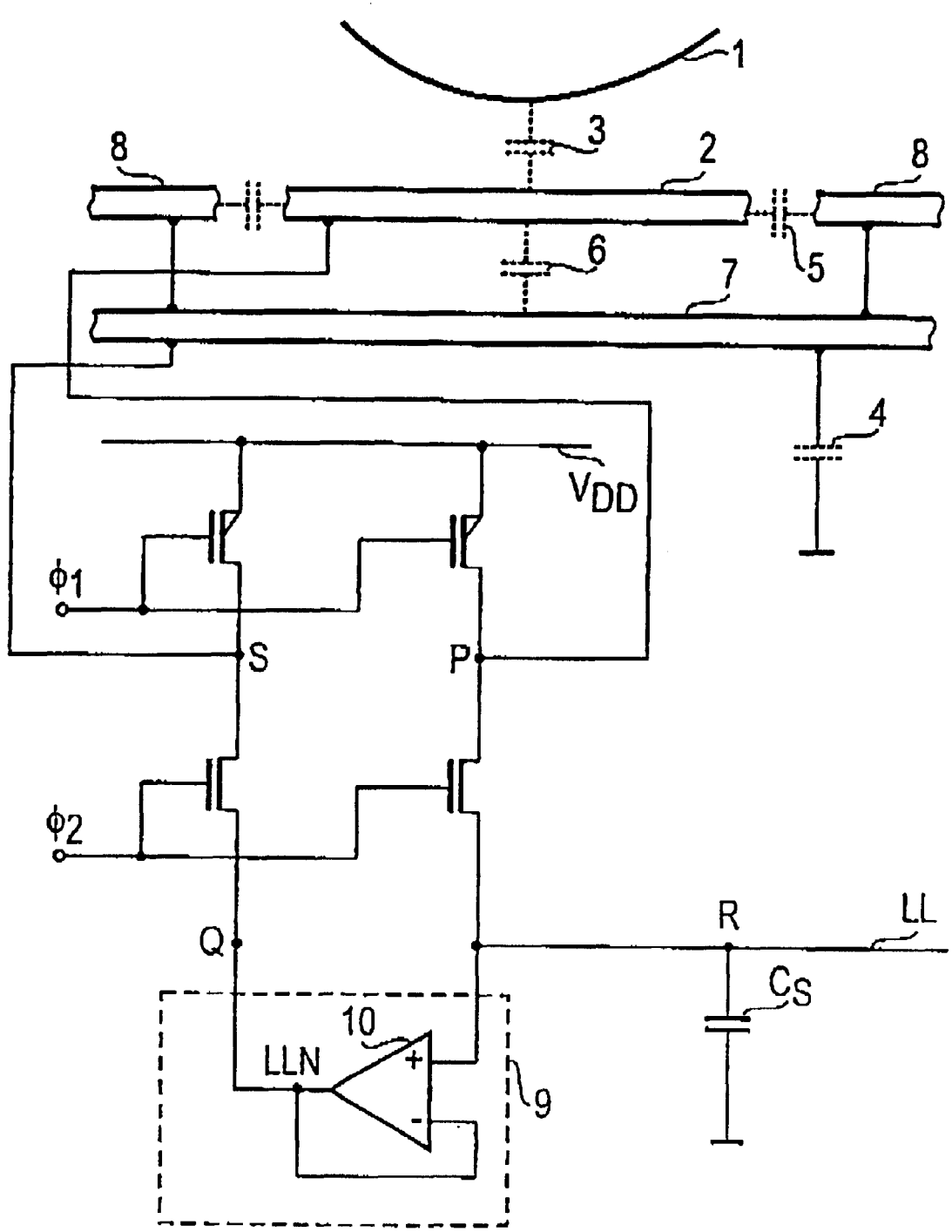
FIG. 1 is a schematic diagram of an individual sensor having a circuit suitable for the method according to the invention.

Referring now to the figures of the drawing in detail and first, particularly, to the schematic and diagrammatic cross section of FIG. 1, there is seen an assembly of conductors in two planes which are coplanar with respect to one another. A detail of an image surface 1, e.g. a ridge of a fingerprint, is situated above a measuring conductor 2 of an upper conductor plane. This measuring conductor 2 in each individual sensor is provided for measuring the capacitance between the image surface 1 and the conductor plane (image/conductor capacitance 3). Situated in the same plane, laterally with respect to the measuring conductor 2, there are further conductors as upper shielding conductors 8. In a second plane, a respective further conductor is arranged opposite the measuring conductor 2. The further conductor forms a lower shielding conductor 7 and is electrically conductively connected to the upper shielding conductor 8. The shielding capacitance 5 present between the measuring conductor 2 and the upper shielding conductor 8 and the shielding capacitance 6 present between the measuring conductor 2 and the lower shielding conductor 7 are depicted by broken lines similarly to the image/conductor capacitance 3. This indicates that there are no capacitor plates present at these locations, rather that an equivalent circuit diagram is meant for a capacitor. In this example, the upper shielding conductor 8 can be imagined such that it surrounds the measuring conductor 2 all around. The two portions of the upper shielding conductor 8 illustrated in FIG. 1 then form the cross section of such a shielding conductor which is present all around the measuring conductor 2.

In addition to the structural acquisition system, FIG. 1 illustrates the associated circuit with which the measurement is carried out. The method according to the invention is carried out in such a way that firstly, in each pixel of the image array, the associated conductors (measuring conductor and shielding conductor) are placed at a specific potential. That is done with the illustrated circuit in that the upper transistors are turned on via a clock control $\Phi_1$, so that the connection potential $V_{DD}$ is present at the nodes S and P and thus on the conductors 2, 7, 8 of the individual sensor. Via the second clock control $\Phi_2$ and the two lower transistors, the charge on the conductors is subsequently dissipated in such a way that, to the extent that is technically possible in terms of circuitry, no potential difference occurs between the measuring conductor 2 and the two shielding conductors 7, 8.

That is preferably achieved by a circuit section 9, which ensures that the potential present at the points Q and R is always the same. This circuit section 9 is preferably constructed using a feedback operational amplifier 10. If the lower transistors are turned on via the clock control $\Phi_2$, the effect is that the same potential is likewise present at the points P and S of the circuit. In a preferred embodiment of the method, the potential is tracked separately in the manner described for each image pixel, i.e. each individual sensor, thereby preventing the generation of a potential difference on the conductors. A higher sensitivity of the individual measurement is achieved in this way, because interference or stray capacitances are shielded and undesirable displacement currents are prevented. Moreover, the electric field is homogenized between the two conductor planes at the edge of the measuring conductor 2. Moreover, the lower shielding conductor 7 shields the measuring arrangement from a parasitic capacitance caused, for example, by a substrate on which the assembly is applied (sensor/substrate capacitance 4 in FIG. 1). In principle, any desired counterelectrodes of a multilayer metallization may be used as lower shielding conductors 7.

The discharging of the measuring arrangement which is performed after each charging cycle is effected via a collecting capacitor $C_S$, on which the charges are collected, until the charge on this capacitor or the voltage present across this capacitor is so large that it can be measured with relatively little technical complexity. On account of the different image/conductor capacitances 3, different charges result on the conductors from pixel to pixel. In a corresponding manner, the charges collected on the collecting capacitors $C_S$ differ for the individual pixels, so that the image can be reconstructed from the determination of these charges.

The individual pixels are preferably selected via read lines LL after the manner of the cell array of a matrix memory. An arrangement of this type is complex. It requires, in particular, an operational amplifier 10 and a compensation line LLN per row of the grid-shaped arrangement of the individual sensors.

The method according to the invention can also be carried out using a simpler conductor structure if complete compensation of the potential difference between the measuring conductors 2 and the shielding conductors 7, 8 is dispensed with. A circuit section 9 then suffices for compensation purposes, and it is possible to manage with one operational amplifier 10 for all of the read lines LL. This operational amplifier is then driven by this one read line LL e.g. in the center of the cell array (grid-shaped arrangement of the individual sensors). Since the potential profile during the charging and discharging operations corresponds to the average profile of these operations on the individual sensors, compensation is effected in each individual sensor with very good accuracy.

A further possibility for implementing the method using a relatively simple arrangement is to completely dispense with the driving by a read line. All of the read lines are simulated by the sensor capacitance to be measured, whose charge is simply dissipated onto the collecting capacitor $C_S$. These charges are detected by measurement when enough charges have accumulated thereon after a plurality of charging and discharging cycles. The simplest form of compensation is fixing at a fixed voltage. To that end, the point Q of the circuit is put at a fixed potential and it is then possible to manage without the circuit section 9. This potential is the same for all of the individual sensors. Although the compensation line has a voltage swing which is too small at the beginning and too large at the end, on average the compensation is balanced. In the two cases described, with identical compensation for all of the individual sensors, the driving can be performed from the edge of the sensor array, which greatly simplifies the outlay on circuitry.

Figure 2:
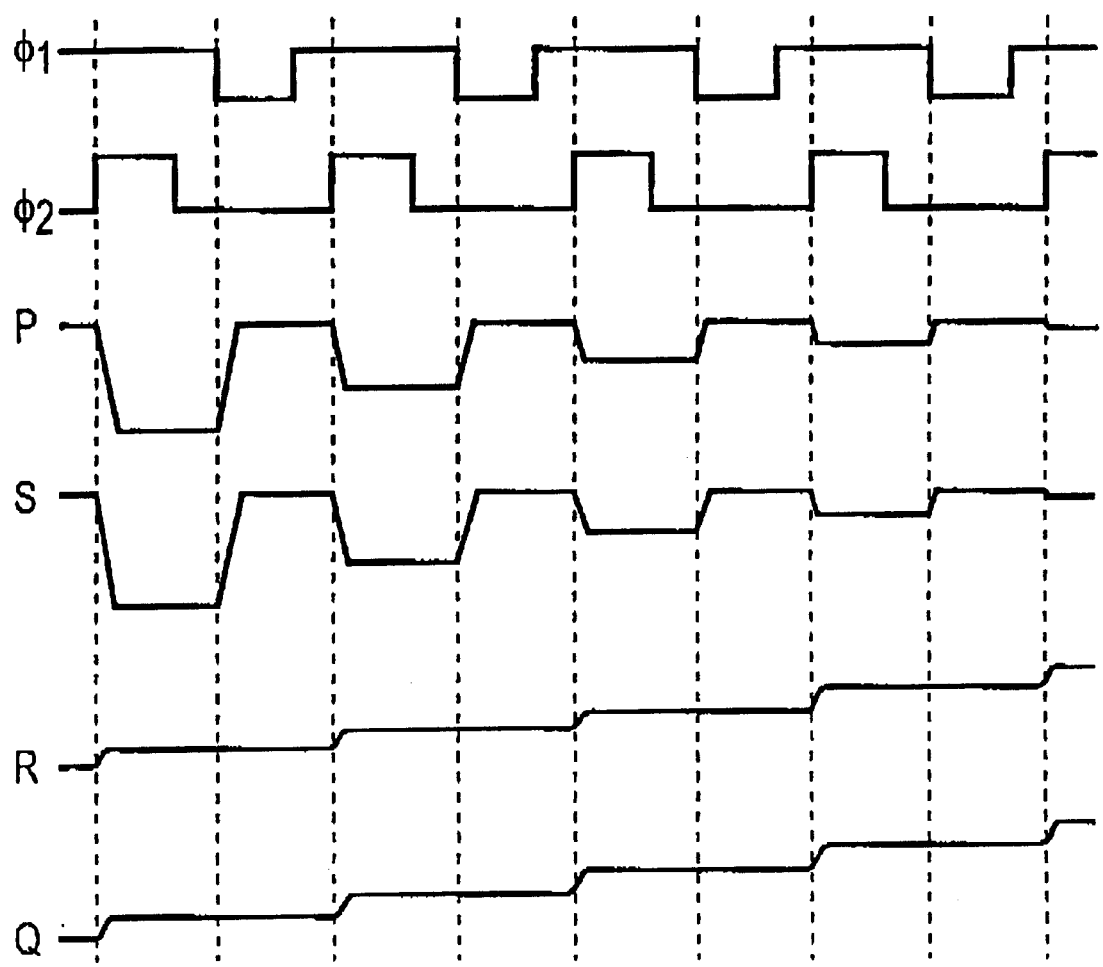
FIG. 2 is a collective graph of diagrams of electrical potentials at different points in the circuit of FIG. 1.

Referring now to FIG. 2, there are shown the typical potential profiles at the individual points of the circuit illustrated in FIG. 1. The discharging clock signals $\Phi_2$ are in each case temporally staggered relative to the charging clock signals $\Phi_1$. On account of the compensation that is performed, the voltage profiles at the points P and S are identical or, in the case of the simplified embodiment of the method with a simplified circuit, at least approximately identical. The voltage at the points P and/or S falls to a lower and lower value during the discharges, since the collecting capacitor $C_S$ is charged to an increasing extent, and the minimal voltage at the points P and/or S thus increases in the course of time. The potentials at the point R and at the point Q, which is carried along via the compensation with the potential at the point R, are likewise illustrated in FIG. 2.

Figure 3:
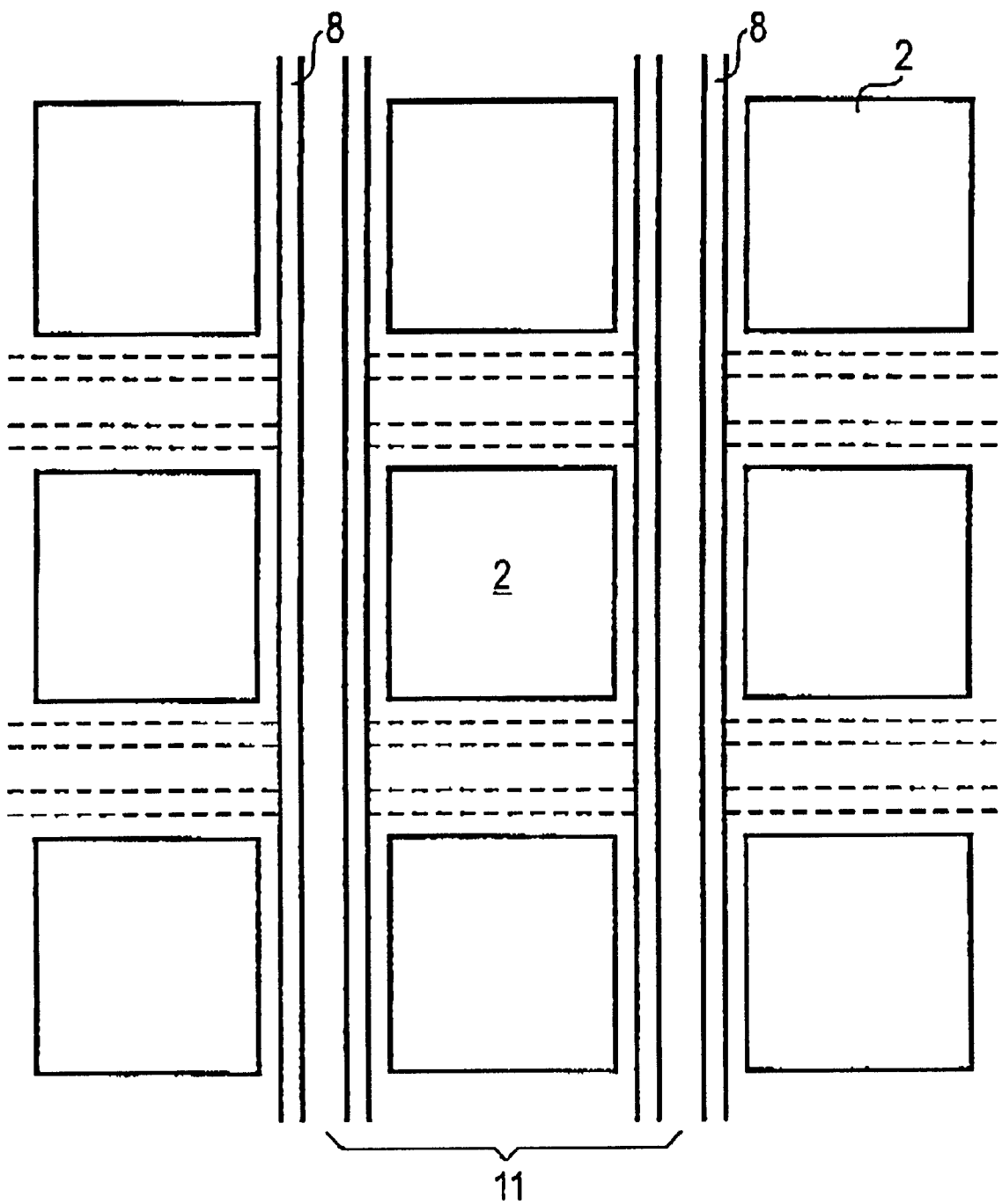
FIG. 3 is a plan view onto an arrangement of electrical conductors suitable for the novel method.

With reference to FIG. 3, there is shown the grid-shaped arrangement of the measuring conductors 2—respectively provided for the measurement—of the upper conductor plane with the upper shielding conductors 8 in between. These shielding conductors 8 are depicted here as a further example as strips between individual columns 11 of the matrix-type arrangement. Instead of this shielding between individual columns of the assembly, there may also be present, all around the measuring conductors 2, a respective shielding conductor 8 in accordance with the borders depicted by broken lines.

The method according to the invention can also be implemented irrespective of the precise structuring of the conductors. All that is essential in this case is that a group of conductors be present for each pixel, of which a specific conductor faces the image surface and is provided for the measurement, while the remaining conductors serve for shielding. There has to be a circuit present which can track the electrical potential on the shielding conductors during the charging and during the discharging of the measuring conductor to the potential of the measuring conductor. The geometrical arrangement of the shielding conductors can easily be adapted to the respective requirements.

We claim:

1. A method for capacitive image acquisition, which comprises:

a) dividing an area to be acquired as an image in a grid-shaped array into pixels assigned an assembly of electrical conductors comprising, for each pixel, a measuring conductor and a shielding conductor;

b) placing the area to be acquired as an image opposite the measuring conductors, so that a capacitance is present between the pixels and the measuring conductors in each case dependent on the relevant pixel;

c) at each pixel, connecting the measuring conductor and the shielding conductor to the same electrical potential and disconnecting from the potential;

d) at each pixel, discharging a charge present on one of the measuring conductor and the shielding conductor onto a respective collecting capacitor, and simultaneously compensating a potential difference between the measuring conductor and the shielding conductor; and e) repeating steps c and d until the charges collected on the collecting capacitors have at least a value predetermined to be sufficient for a separate measurement of each collecting capacitor.

2. The method according to claim 1, which comprises compensating the potential difference between the respective measuring conductor and the respective shielding conductor identically for all pixels by placing the shielding conductors on the same predetermined potential.

3. The method according to claim 1, which comprises compensating the potential difference between the respective measuring conductor and the respective shielding conductor separately for all the pixels, by always applying a same potential that is currently present on the measuring conductor to the respective shielding conductor.

* * * * *